United States Patent [19]

Muscat

[11] Patent Number: 4,746,163
[45] Date of Patent: May 24, 1988

[54] COMBINED REMOVABLE PANEL-CONVERTIBLE TOP SYSTEM

[75] Inventor: Peter P. Muscat, Northville, Mich.

[73] Assignee: Jubbu Designers Inc., Livonia, Mich.

[21] Appl. No.: 863,867

[22] Filed: May 16, 1986

[51] Int. Cl.⁴ .......................... B60J 7/12; B60J 7/185
[52] U.S. Cl. .................. 296/120 R; 296/107; 296/136; 296/218
[58] Field of Search ............... 296/107, 111, 120 R, 296/120 A, 121, 122, 124, 136, 218

[56] References Cited

U.S. PATENT DOCUMENTS

| | | | |
|---|---|---|---|
| 3,154,341 | 10/1964 | Booth | 296/136 X |
| 4,573,732 | 3/1986 | Muscat | 296/108 |
| 4,621,861 | 11/1986 | Scaduto | 296/118 |

FOREIGN PATENT DOCUMENTS 2086316  5/1982  United Kingdom .

*Primary Examiner*—Dennis H. Pedder
*Attorney, Agent, or Firm*—John R. Benefiel

[57] ABSTRACT

A convertible top system for automobiles is disclosed including a rear convertible frame extending partially over the passenger compartment when raised, and a removable roof panel which may be emplaced between the windshield frame and the forward main bow of the rear convertible frame. The system allows either a fully or partially open top configuration for automobiles. The rear convertible frame is braced in the raised position by engagement with a hinged tonneau cover panel normally overlying the storage well, but which can be raised to allow movement of the convertible frame in and out of the storage well. Brace blocks move into engagement with knees formed on the lower ends of the frame main bow as the tonneau cover is pivoted down, and a selectively operable pull down and lock mechanisms act on pins connected to a rear bow to cause the rear bow to be compressed against and locked to the tonneau cover.

14 Claims, 10 Drawing Sheets

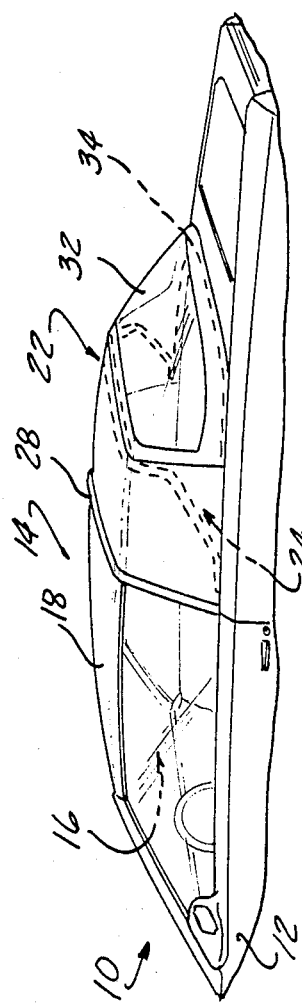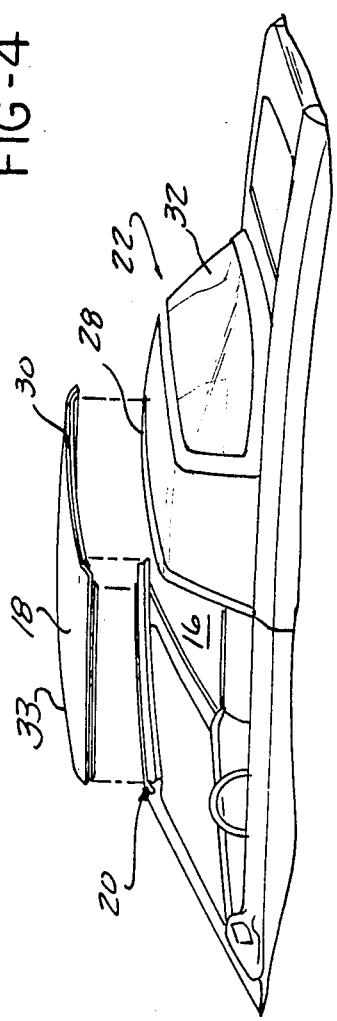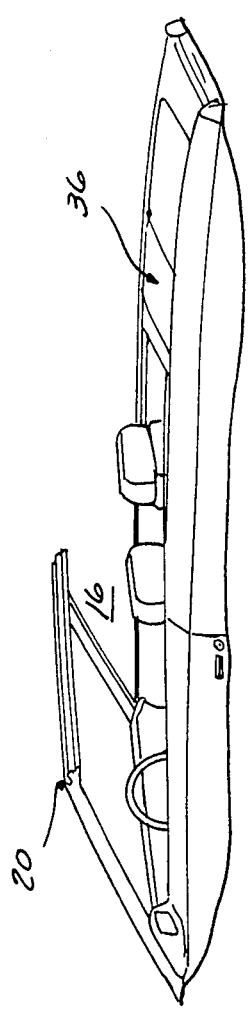

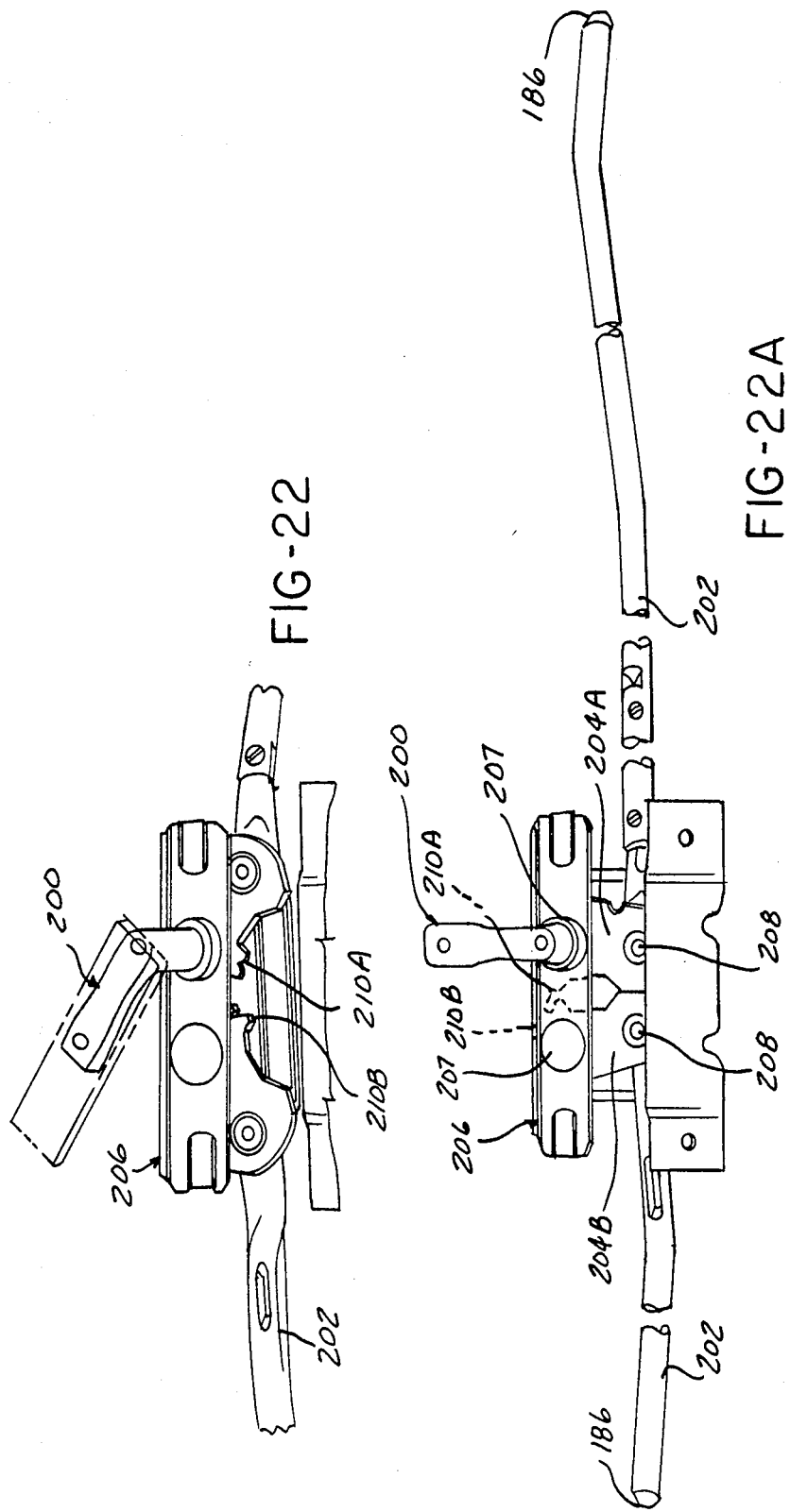

COMBINED REMOVABLE PANEL-CONVERTIBLE TOP SYSTEM

This invention concerns tops for automobiles, and more particularly, a removable panel-convertible top system for automobiles.

BACKGROUND

Convertible tops for automobiles utilize a collapsible frame over which is stretched a fabric covering. The top is let down to be stored in a storage well when an open top is desired.

"Targa" (trademark) top systems are also known in which a rigid roof panel is mounted over the forward section of the passenger compartment and is removable when desired to achieve a partially open top.

It is also known to provide a top system comprised of a fixed bow section acting as a roll bar, which supports the rear edge of the removable panel, and a covering fabric extends from the fixed bow to the rear body deck. The fabric section may be folded away to achieve a partial convertible effect, although the fixed bow remains in position extending over the passenger compartment.

The presence of the fixed bow precludes a fully open top.

It is the object of the present invention to provide a removable panel convertible top system for automobiles which also allows a full open top configuration.

SUMMARY OF THE INVENTION

This and other objects which will be understood upon a reading of the following specification and claims is achieved by providing a foldable frame located over the rear section of the passenger compartment and having a fabric covering stretched thereover. The convertible frame includes a forward main bow member adapted to support a removable rigid panel extending forward to the windshield frame and locked to the windshield frame and main bow by a lever operated mechanism. With the panel removed and the foldable frame lowered into a storage space, a fully open convertible top system is provided. With the panel only removed, a partially open top is provided, while with the convertible section raised and the panel installed, a fully enclosed top results.

A hinged U-shaped tonneau cover panel normally overlies the storage space, within which the foldable frame is stored, but which may be raised to allow access the storage space. The main bow is braced in its raised position by being engaged with brace blocks carried by the tonneau cover when the main bow is raised when the tonneau cover is hinged down in position over the storage space. A pull down and locking mechanism acts on pins fixed to a rear bow included in the convertible frame, to draw the rear bow against the tonneau panel to be sealed thereagainst and provide additional bracing of the convertible frame.

DESCRIPTION OF THE DRAWINGS

FIG. 4 is an enlarged fragmentary perspective view of the automobile as shown in FIG. 1.

FIG. 5 is an enlarged fragmentary perspective view of the automobile shown in FIG. 4 with the panel removed.

FIG. 9 is an enlarged fragmentary perspective view of the automobile shown in FIGS. 4-8 with the tonneau cover in position overlying the storage well.

FIGS. 22 and 22A are fragmentary perspective views of the auto windshield frame showing the panel pin socket assembly.

DETAILED DESCRIPTION

In the following specification, a specific embodiment is described in accordance with the requirements of 35 USC 112, and particular terminology employed, but it should be understood that the invention is not so limited and is capable of taking many forms and variations within the scope of the appended claims.

Figure 1:
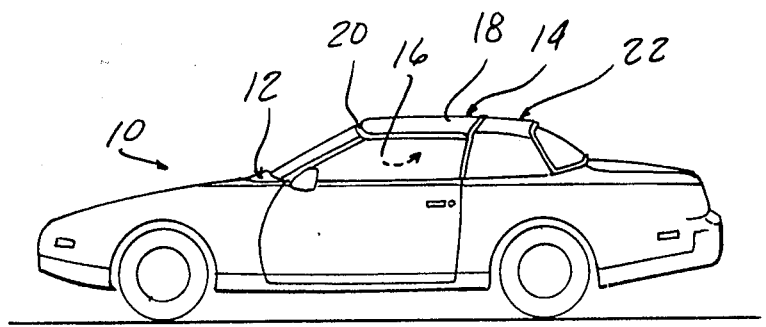
FIG. 1 is a side elevational view of an automobile incorporating the top system according to the present invention.
Figure 2:
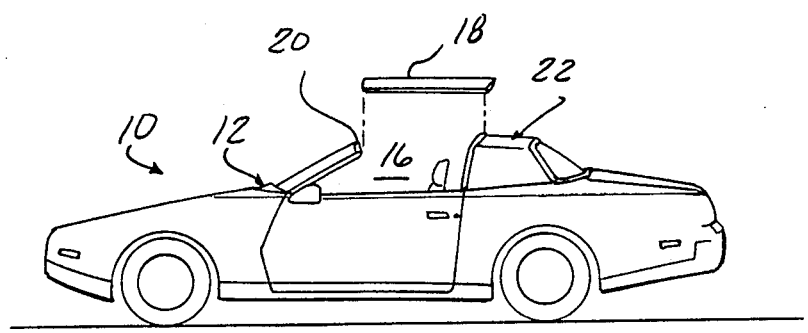
FIG. 2 is a side elevational view of the automobile shown in FIG. 1 with the panel of the top system removed.
Figure 3:
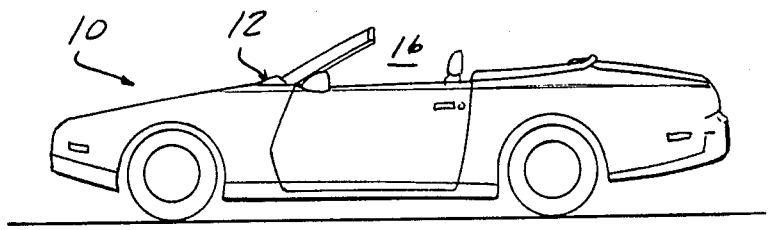
FIG. 3 is a side elevational view of the automobile shown in FIGS. 1 and 2, with the panel removed and a rear section convertible frame lowered.

Referring to the drawings and more particularly FIGS. 1-3, an automobile 10 is shown having a body provided with a top system 14, shown fully enclosing the passenger compartment 16. The top section 14 includes a forward located removable "targa" (trademark) panel 18 positioned above the forward section of the passenger compartment 16, supported on its forward end on upper member 26 of the windshield frame and on its other end by the convertible section 22 of the top system 14.

As shown in FIG. 2, the panel 18 is removable, to create a "targa" (trademark) or partially open top.

Finally, as shown in FIG. 3, the rear section 22 of the top system 14 may be completely lowered to provide a completely open passenger compartment 16.

Referring to FIG. 4, it can be seen that the convertible section 22 comprises a foldable frame 24 over which is stretched a fabric covering 26. The frame 24 includes a forward main bow 28 arched over the passenger compartment 16 on which the trailing side of the panel 18 is supported.

A suitable rear window panel 32, as of clear plastic is provided in the fabric covering 26 as per conventional practice.

Figure 8:
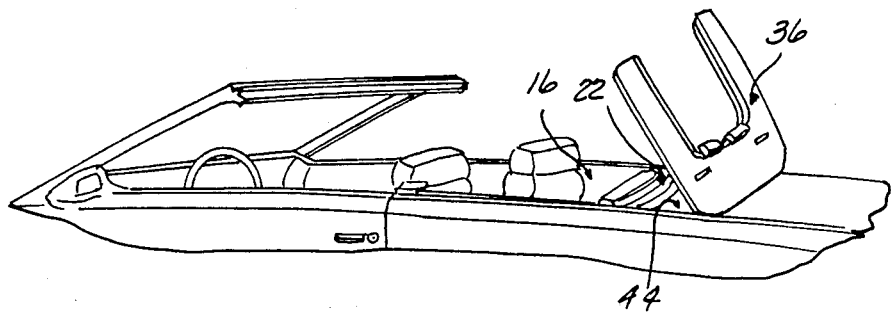
FIG. 8 is an enlarged fragmentary perspective view of the automobile shown in FIGS. 4-7, with the convertible top section let down into the storage well.

The panel 18, is latched at its forward end 32 and rear end by suitable latching mechanisms to be described, to the upper windshield frame member 20 and the main bow 28, respectively, and upon being unlatched may be removed as shown in FIG. 8.

The convertible section 22 may be left in the raised position as shown to provide a partially open top, since it is braced and locked in this position independently of the panel 18 by means to be described hereinafter.

Finally, the convertible section 22 may be readily lowered and stowed to provide a full convertible styling, as shown in FIGS. 6-9.

Figure 6:
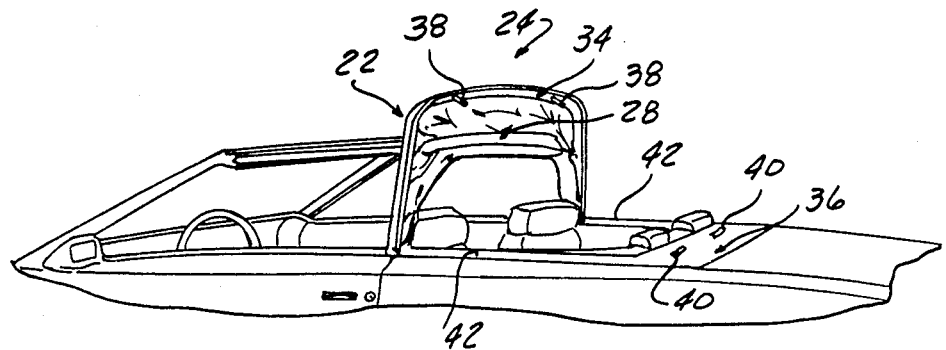
FIG. 6 is an enlarged fragmentary perspective view of the top portion of the automobile shown in FIGS. 4 and 5, with the convertible frame released from the tonneau cover and the rear bow partially elevated.

In order to do this, a rear bow 34 of the convertible frame 24 is released from a tonneau cover 36 to which it has been attached by means of locking pins 38 received in sockets 40 carried by the tonneau cover 36, a locking mechanism to be described selectively operable to secure or release pins 38 in sockets 40. This allows the frame 24 to be pivoted up, with the rear bow 34 arched over the main bow 28, completely clear of the forward ends of the U-shaped tonneau cover 36, as shown in FIG. 6.

Next, the tonneau cover 36 is released to allow it to be hinged upwardly to expose a top storage space 44 extending to the rear of the passenger compartment 16 and along either side thereof to be able to receive the convertible top section 22 when it is swung down as shown in FIG. 8.

Finally, the tonneau panel 36 is hinged down and latched in position as shown overlying the storage space 44 and providing smooth convertible styling as shown in FIG. 9.

Figure 10A:
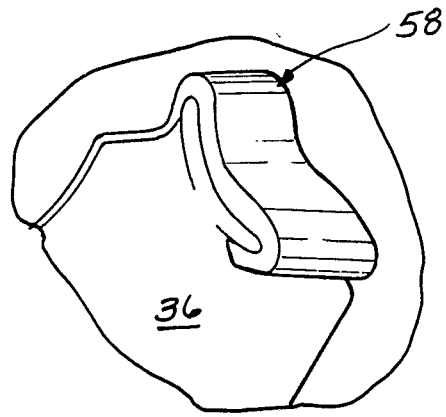
FIG. 10A is an enlarged view of the region in the circle in FIG. 10
Figure 10:
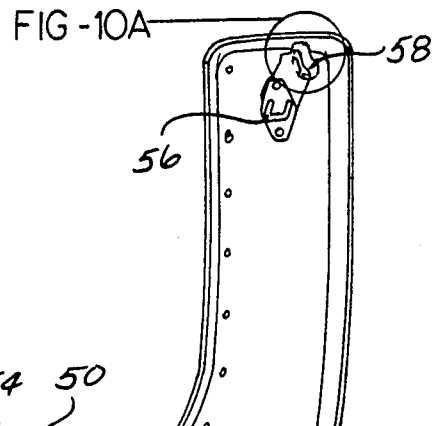
FIG. 10 is a fragmentary perspective view of the underside of the tonneau cover hinged to the raised position over the storage well.

As mentioned, the tonneau cover 36 is generally U-shaped in order to be configured to overlie the also U-shaped storage space 44. The tonneau cover 36 is hinged at spaced points 46 along its rear edge to be able to be raised as shown in FIG. 10 to provide access to the storage space 44 and raising and lowering of the convertible section 22.

Suitable counter balancing cylinders 48 may be used to hold the tonneau cover in its raised position as shown.

The inside edge of the connecting side of the tonneau panel 36 may mount headrests 50 for the rear seats 52, moved into position just above the rear seats 52 as the tonneau cover 36 is lowered over storage space 44.

A locking mechanism 54 is mounted to the underside of the connecting section of the tonneau panel to operate the locking of the pins 38 in the sockets 40, as will be described hereinafter in further detail.

The tonneau cover 36 has affixed to the underside of the forward end of each leg section a latching loop 56 and a V-shaped brace block 58, each moved to their respective operative positions as the tonneau panel 36 is moved to its closed position.

Figure 11:
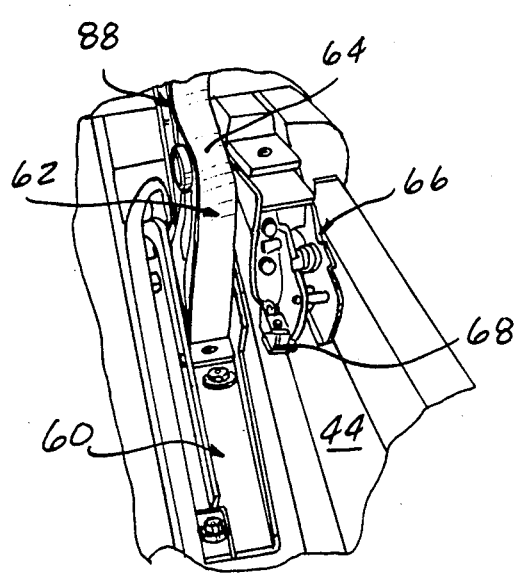
FIG. 11 is a perspective fragmentary view of the inside of the side well portion of the convertible top storage space showing the lower end of one side of the convertible frame mounted therein.
Figure 10B:
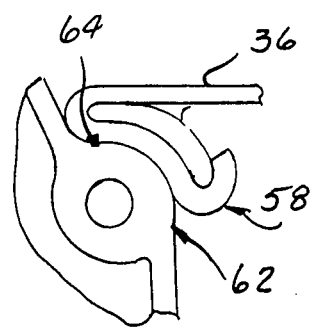
FIG. 10B is a fragmentary side view of the mating relationship of the brace block and the knee of the main bow, with the tonneau panel lowered in place.

Referring to FIG. 11, it can be seen that bracket 60 pivotally mounting a respective end of the main bow 28 is affixed within the side well region of the storage space 44.

Either end of the main bow 28 has a lower section 62 formed with a bracing knee 64 located to be engaged with the brace block 58 with the tonneau cover 36 lowered into its covering position.

This provides a support for the convertible frame 28 to maintain it in its raised position by bracing the main bow 28 in its vertical, erect position. When combined with the locking of the rear bow 34 to the tonneau cover 36, the convertible frame 24 is rigidly supported in its raised position even in the absence of the bridging panel 18.

The tonneau panel 36 is latched in its lowered position with a latching mechanism 66 also mounted in the side well region of storage space 44, and located to receive latching loop 66 and retain the same until a cable 68 operated lever 70 (FIG. 10) is pulled to release the latching mechanism 66. Since suitable such latching mechanisms are well known, as are widely used to latch vehicle doors, a detailed description is not here provided.

Figure 7:
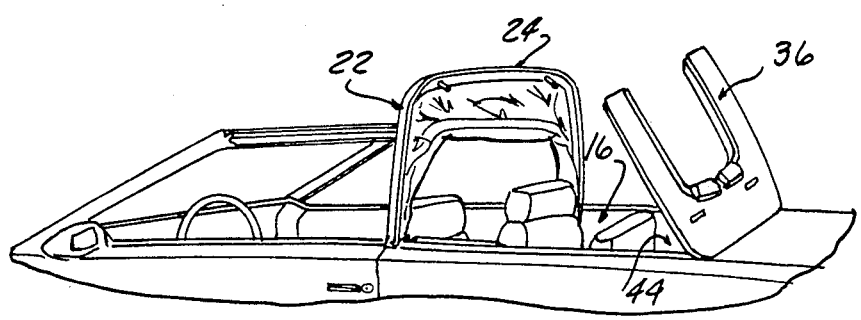
FIG. 7 is an enlarged fragmentary perspective view of the top portion of the automobile shown in FIGS. 4-6, with the convertible frame collapsed and pivoted to the vertical position and the tonneau cover hinged to the open position.
Figure 12:
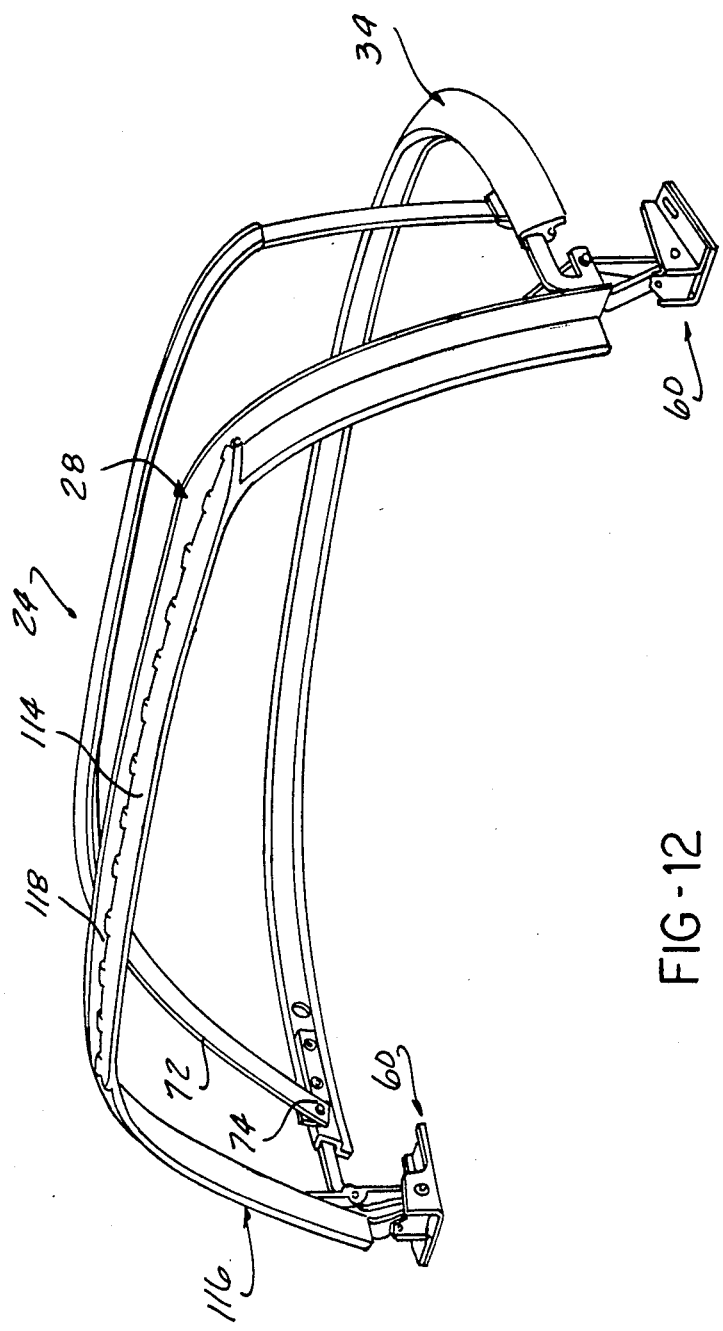
FIG. 12 is a perspective view of the convertible top frame used in the top system according to the present invention.

The convertible frame 24 is shown in FIG. 12, in which either end of the main bow 28 is pivoted to a mounting bracket 60. Convertible frame 24 also includes an intermediate bow 72 having either end pivoted at 74 to brackets attached to the rear bow 34, enabling the frame 24 to be collapsed into a single plane lying within the raised rear bow 34 as seen in FIGS. 6 and 7. The covering material 26 and rear window panel 32 is gathered between the main bow 28, intermediate bow 72 and rear bow 34, so as to be entirely received in the U-shaped storage space 44.

Figure 13:
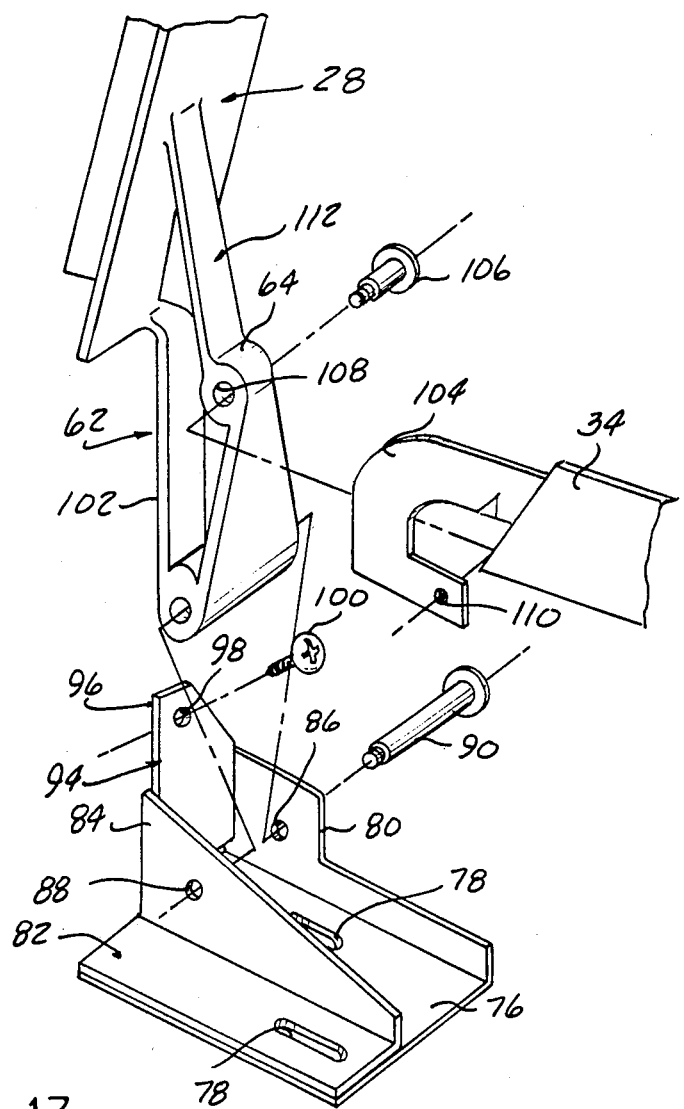
FIG. 13 is an exploded perspective view of the lower end of one side of the convertible frame and mounting bracket, together with attaching hardware components.

Referring to FIG. 13, the details of the mounting bracket 60 and lower end 62 of the main bow 28 can be seen.

The mounting bracket 60 includes a bottom plate 76 having openings 78 to receive suitable fasteners for securement to the vehicle body.

Bottom plate 76 is formed with a side wall providing a first mounting flange 80, while an angled plate 82 is also formed to provide a second spaced flange 84.

Through opening 86 and tapped hole 88 allow mounting of pivot bolt 90 passing through a bore 92 formed in the lowest part of end 62 of main bow 28, to establish the pivotal mounting thereof.

A web is also provided bridging walls 80 and 84, and having an angled upper portion 96 formed with a tapped hole 98 receiving a screw 100. Front face 102 of end piece 62 abuts against screw 100 to provide an adjustable stop means limiting pivoting motion of the main bow 28 in the raising direction.

Rear bow 34 is pivotally mounted to end piece 62 by means of hooked piece 104 fixed to each end of rear bow 34. Pivot bolt 106 passes through bore 108 and is received in tapped hole 110, thus allowing pivoting of the rear bow 34 to be moved above the main intermediate bow 72 to let down the top 22.

The brace knee 64 is located just beneath a gusset 112 bracing the main bow 28 to be securely positioned by engagement with the brace block 58.

Figure 15:
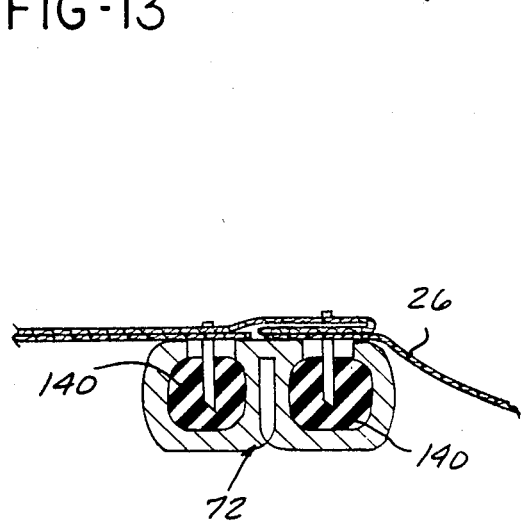
FIG. 15 is a sectional view taken through the intermediate bow of the convertible frame utilized in the present invention.
Figure 16:
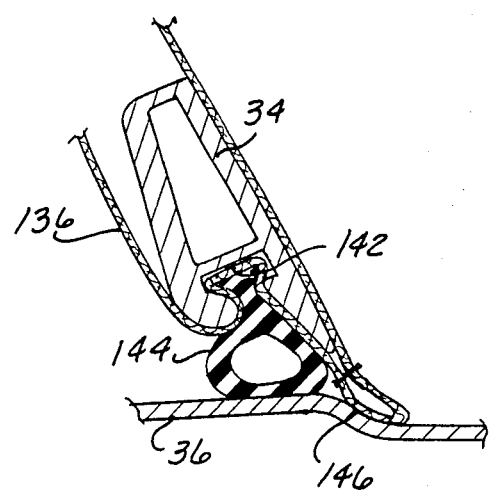
FIG. 16 is a sectional view taken through the rear bow of the convertible frame utilized in the present invention.
Figure 14:
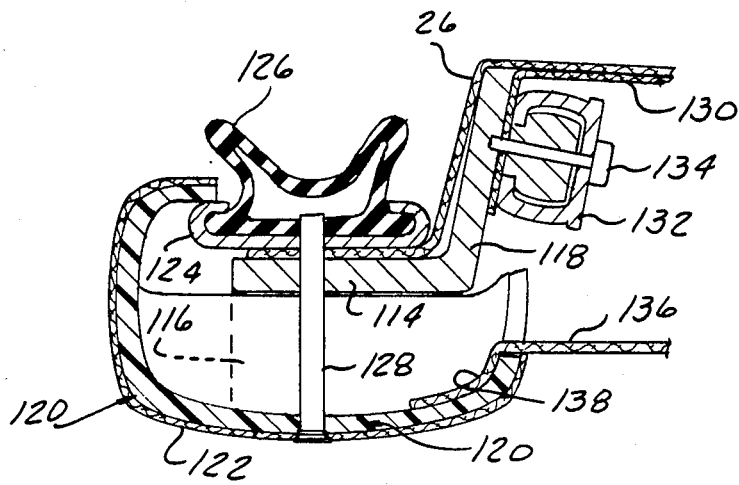
FIG. 14 is a sectional view taken through the main bow of the convertible frame utilized in the present invention.

Referring to FIGS. 14–16, the details of the convertible section covering are shown.

The front main bow 28 includes a horizontal panel flange section 114 and side flanges 116 integral with a generally vertical web 118.

Affixed to the flange 114 is a roughly C-shaped molded plastic trim member, covered with a layer of fabric 122, extending over a gasket channel 124 mounting rubber gasket 126.

Screws 128 pass through each and are received in gasket channel 124 to secure the assembly together.

Figure 17:
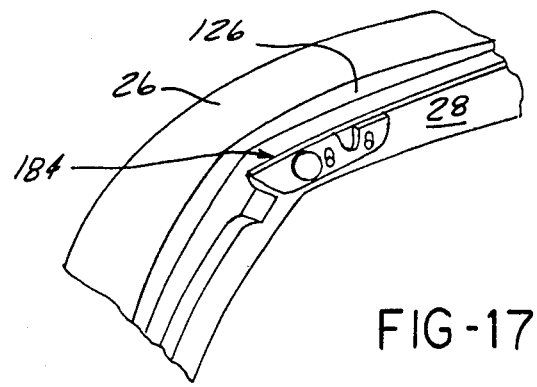
FIG. 17 is a perspective fragmentary view of one side of the convertible top section showing the pin socket assembly.

The trim member extends along the entire length of the main bow 28, but is positioned directly against the side flanges 116, so that a greater width is afforded in the region of horizontal flange 114, to match the width of the targa panel 18. (See FIG. 17)

The covering top layer 26 is secured beneath the gasket channel 124 as shown, while a liner layer of fabric 130 is secured beneath a retainer 132 secured with screws 134 to the back side of web 118.

A headliner layer 136 is stretched over the interior of convertible section 22, fastened as by Velcro layers at 138 to the interior of trim member 120 to the rear bow 34, and also sewn to the region around window panel 32 so as to be stretched taut as the frame 24 is unfolded and provide an attractive finished interior appearance.

As seen in FIG. 15, intermediate bow 72 is formed as a double grooved shape having plastic inserts 140 to enable stapling of sections of the top 26 to the rear insert 140, while the liner 130 is stapled to the forward insert 140.

The rear bow 34 is generally A-shaped in section, as seen in FIG. 16, formed with a retainer groove 142.

The top material 26 is looped and sewn with the edge inserted in retainer groove 142. The bottom of a seal 144 is also inserted in retainer groove 142. The looped edge and seal 144 press against a ridge 146 of the tonneau panel 36 to effect a seal as the rear bow 34 is drawn against the upper surface of the tonneau panel 36 and locked thereto.

Figure 18:
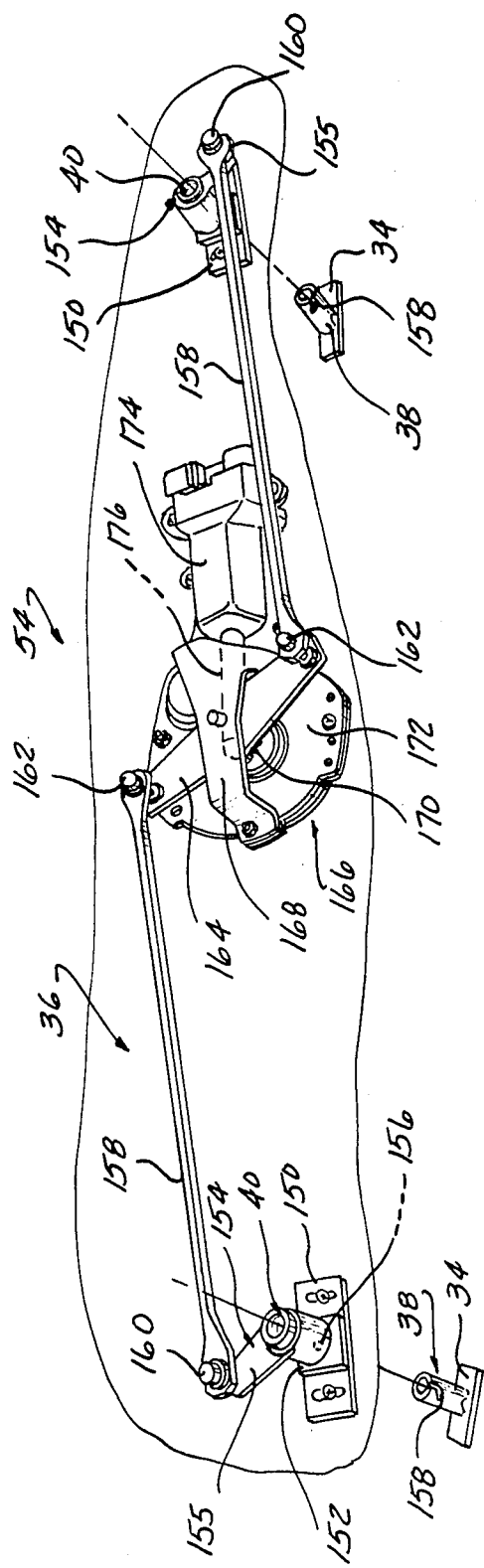
FIG. 18 is an inverted perspective view of the rear bow pull down and locking mechanism.

Referring to FIG. 18, the locking mechanism 54 which draws the rear bow 34 down against the upper surface of the tonneau panel and locks the pins 38 in the sockets 40 is shown in an inverted position.

The sockets 40 are each mounted on a bracket 150 secured to the undersurface of the tonneau panel 36, so as to be rotatable on a bushing plate 152.

The sockets 40 each are rotated by sleeves 154 having operating arms 155 attached thereto so as to cause a camming action between an internal cam pin 156 mated with a cam track 158 formed into each pin 38 affixed to the rear bow 34. Rotation of sleeves 154 draws the pins 38 and rear bow 34 downwardly to secure and seal the rear bow against the upper surface of the tonneau cover 36.

Rotation of sleeves 154 is provided by movement of operating bars 158 pivoted at one end 160 to the outer end of each arm 155. The operating bars 158 are each pivoted at their other ends 162 to a rotary cross lever 164 forming a part of a rotary actuator mechanism 166 mounted to the undersurface of the tonneau cover 36. The cross lever 164 is pivoted on bracket 168 and attached to a gear 170 rotatably mounted on housing 172. Gear 170 is rotated by a reversible motor 174 driving a pinion gear shaft 176.

Suitable electrical controls (not shown) enable selective switch operation to clamp and lock the rear bow 34 after insertion of the pins 39 in sockets 40, or to unclamp and release the same.

Figure 19:
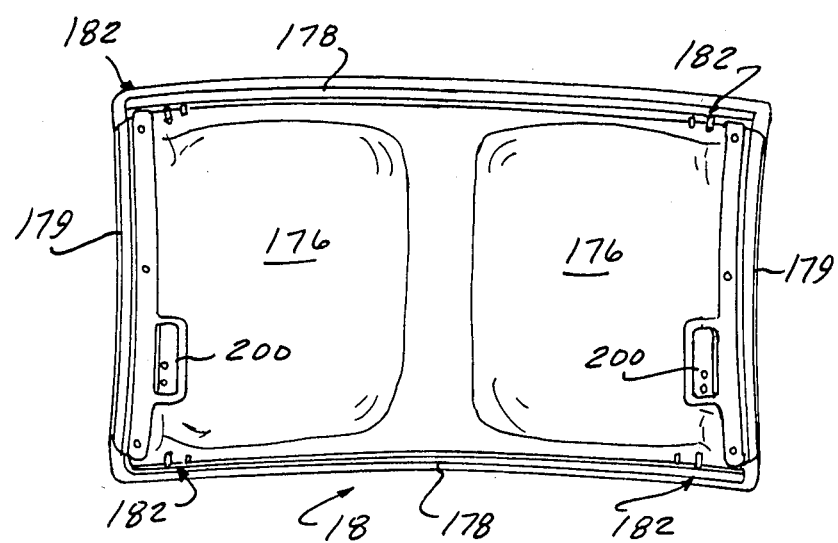
FIG. 19 is an inverted plan view of the panel utilized in the top system according to the present invention.

As seen in FIG. 19, the panel 18 is rectangular in shape, fabricated by formed metal or molded plastic, with a suitable upper panel overlain with a top matching covering fabric on the outer surface.

A pair of shaped recesses 176 provide necessary headroom on each side, with the entire interior surface covered with suitable headliner material.

Figure 20:
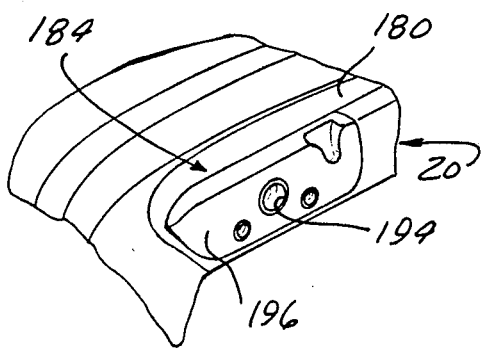
FIG. 20 is a plan view of one of the two locking pin operating mechanisms installed within the panel shown in FIG. 19, shown in the pin extended position.

The leading and trailing sides of the panel 18 are each formed with flanges 178 configured to overlie seals 126 (FIG. 17), 180 (FIG. 20) mounted respectively on the windshield upper frame member 20 and main bow 28. Side seals 179 are secured along each side of panel 18 and configured to seal against the vehicle windows. Pin locking assemblies 182 are located at each corner of the panel 18 engageable with pin socket assemblies 184 (FIGS. 17, 20) located on either side of the top of main bow 28 and windshield frame top member 20.

The pin locking assemblies 182 each comprise a retractable locking pin 186 movable in and out of guide bushing 188 carried by mounting plate 190 fastened to corner end face of the panel 18.

A headed pin 192 is also fixed extending from mounting plate 190.

Each locking pin 186 is movable into a socket 194 carried by mounting plate 196, while the head of each header pin 192 is received in vee slot 198, passing behind the thickness of the plate 196 to establish a fore and aft securement of the panel 18, preventing any movement along that direction.

Figure 21:
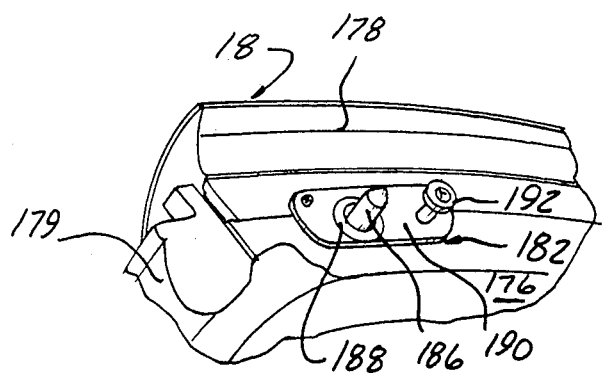
FIG. 21 is a fragmentary plan view of the locking pin operating mechanism shown in the pin retracted position.

The locking pins 186 are selectively extended by pivoting of handles 200 located on either side of panel 18. As seen in FIG. 21, with the handles 200 pivoted out, bars 202 integral with pins 186 and mounted within panel 18, are moved together because levers 204A, 204B, pivotally mounted to brackets 206 at 207 are pinned at 208 to bars 202, to be drawn together as handle 200 is moved to the vertical position.

Thus, the pins 186 are withdrawn prior to installation or removal of panel 18, and then extended to lock the panel 18 in place by pivoting handles 200 to be extended in the fore and aft direction.

Figure 23:
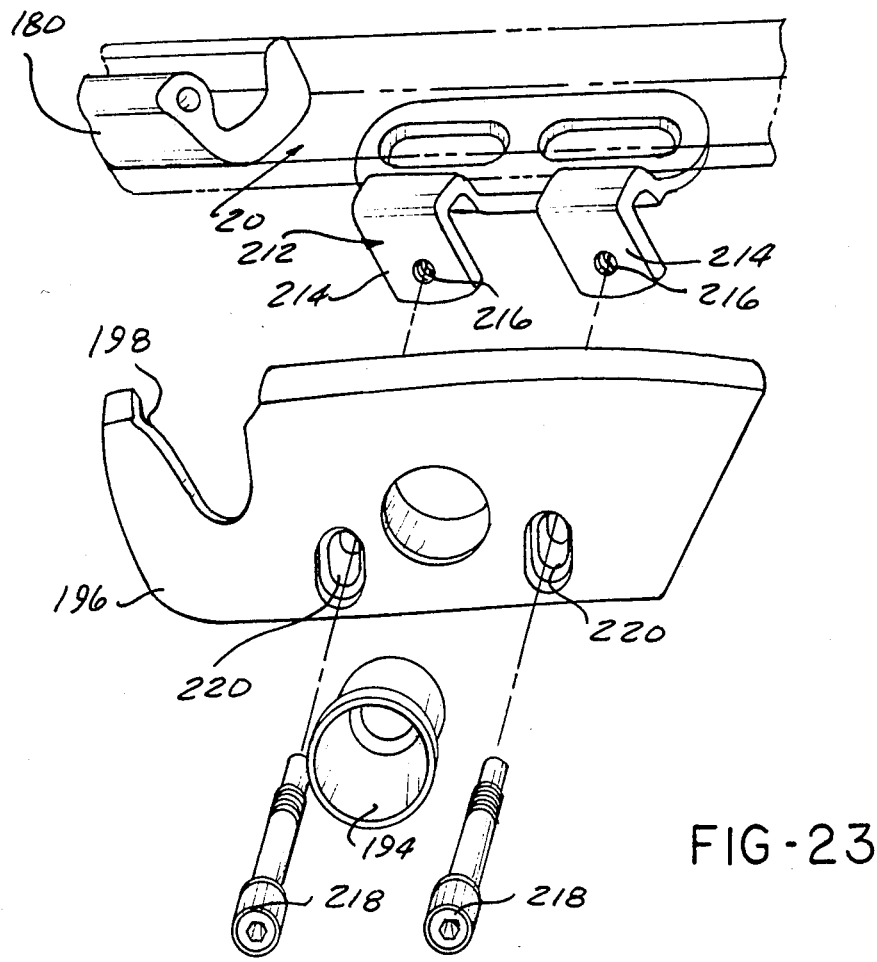
FIG. 23 is an exploded perspective view of the panel pin socket assembly and associated mounting structure.

The mounting plates 196 are secured by brackets 212 mounted beneath the windshield top member 20 and main bow 28, as seen in FIG. 23. Brackets 212 include spaced prongs 214 located away from the supporting member, each prong 212 formed with a tapped hole receiving a screw 218 passing through elongated holes 220 formed in mounting plate 196. Thus, clearance is provided to accommodate pins 186 and headed pin 192.

Accordingly, it can be appreciated that a unique top system has been provided, enabling a true convertible to be combined with a removable panel top. The system affords a fine finished appearance, while being solidly constructed, suitable for application in quality automobiles.

I claim:

1. A top system for an automobile having an automobile body defining a passenger compartment having a forward and a rear section and including a windshield frame having a horizontal top member extending across the front of the forward section, said top system comprising:

a convertible top extendible over said rear section of said passenger compartment, including a foldable frame covered with fabric, said convertible top adapted to be raised to extend over said rear section from a lowered stowed position, and a storage space formed in said auto body receiving said convertible top in said stowed position;

a rigid panel configured to overlie said forward section between said raised convertible top and said windshield frame top member and means for releasably locking said panel to said windshield frame top member and to said raised convertible top;

a tonneau cover configured to overlie said storage space, said tonneau cover hinged along a rear transverse side to be adapted to be raised to provide access to said storage space; said convertible top foldable frame including a main bow member movable to be in a raised position extending vertically and arching over said passenger compartment with said convertible top raised, said main bow including lower ends on either side thereof, each pivotally mounted in a respective side well region of said storage space, to be rotated from a lowered stowed position to a raised position, and bracing means attached to said tonneau cover and said main bow lower ends, said bracing means interengaged to act when said tonneau panel is lowered and overlying said storage space to brace said main bow in said vertical position, whereby a partially or completely open top may alternatively be provided for said automobile passenger compartment by removal of said panel only or by removal of said panel and lowering of said convertible top.

2. The top system according to claim 1 wherein said convertible top foldable frame includes a curved rear bow terminating in ends located on either side of said passenger compartment, said ends connected to said main bow, said rear bow extending horizontally and around the rear of said passenger compartment and lying atop said tonneau cover with said convertible top raised.

3. The top system according to claim 2 further including pull down and locking means selectively operable to draw said rear bow against said tonneau panel and to be locked thereto with said convertible top raised to enable sealing of said convertible frame thereagainst and to provide further support of said main bow.

4. The top system according to claim 1 wherein said bracing means includes a pair of brace blocks attached to said tonneau panel each located to engage a respective lower end of said main bow with said main bow erect as said tonneau cover is moved to overlie said storage space.

5. The top system according to claim 4 wherein each of said brace blocks has a vee-shaped portion, and wherein each of said main bow lower ends is formed with a knee engaged by a respective brace block with the vee-shaped portion thereof fit thereover to brace said main bow.

6. The top system according to claim 3 wherein said pull down and locking means comprises pins affixed to said rear bow and respective sockets mounted to said tonneau panel and located to receive said pins.

7. The top system according to claim 6 wherein said pull down and locking means further comprises selectively operable cam actuation means acting on said pins to advance said pins into said sockets.

8. The top system according to claim 7 wherein said cam actuation means includes means for rotating each of said sockets and also includes interfitting camming surfaces formed respectively on said pins and sockets.

9. The top system according to claim 1 wherein said panel is formed with flanges received on said windshield frame top member and said main bow respectively, pin socket assemblies fixed respectively to each of said windshield frame top member and said main bow and wherein said panel carries pin locking means for locking said panel to said pin socket assemblies respectively affixed to each of said windshield frame top member and said main bow.

10. The top system according to claim 9 wherein said pin locking means each includes a pin and each of said pin socket assemblies includes a socket to receive a respective pin.

11. The top system according to claim 10 wherein each of said pin locking means includes a fixed headed pin and each of said pin socket assemblies includes a member formed with a vee groove receiving a respective headed pin as said panel flanges are placed on said windshield frame top member and main bow, said mated headed pins and vee grooves adapted to control fore and aft motion of said panel.

12. The top system according to claim 2 further including an intermediate bow located between said main bow and rear bow and pivotally mounted to said rear bow so as to be pivotable towards said main bow together with said rear bow to fold said convertible frame together.

13. The top system according to claim 12 wherein said convertible top includes a covering fabric attached to overlie each of said bows, and further including a headliner layer mounted within said bows.

14. The top system according to claim 13 including a C-shaped trim member mounted to said main bow with said headliner layer received within said trim member.

* * * * *

UNITED STATES PATENT AND TRADEMARK OFFICE
CERTIFICATE OF CORRECTION

PATENT NO. : 4,746,163
DATED : May 24, 1988
INVENTOR(S) : Peter P. Muscat

It is certified that error appears in the above-identified patent and that said Letters Patent is hereby corrected as shown below:

Column 1, line 50, "access" should be --access to--.

Column 5, line 1, "web" should be --web 94--.

Column 5, line 22, "trim member" should be --trim member 120--.

Signed and Sealed this

Twenty-first Day of May, 1991

Attest:

HARRY F. MANBECK, JR.

Attesting Officer        Commissioner of Patents and Trademarks